United States Patent
Tigrek

(10) Patent No.: US 11,169,868 B2
(45) Date of Patent: Nov. 9, 2021

(54) AUTOMATED FAULT MONITORING AND MANAGEMENT METHOD

(71) Applicant: ASELSAN ELEKTRONIK SANAYI VE TICARET ANONIM SIRKETI, Ankara (TR)

(72) Inventor: Recep Firat Tigrek, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 16/714,820

(22) Filed: Dec. 16, 2019

(65) Prior Publication Data

US 2021/0089378 A1 Mar. 25, 2021

(30) Foreign Application Priority Data

Sep. 20, 2019 (TR) .................... 2019/14300

(51) Int. Cl.
*G06F 11/07* (2006.01)
*G06F 16/901* (2019.01)

(52) U.S. Cl.
CPC ........ *G06F 11/079* (2013.01); *G06F 11/0751* (2013.01); *G06F 11/0772* (2013.01); *G06F 16/9024* (2019.01)

(58) Field of Classification Search
CPC .............. G06F 11/079; G06F 11/0751; G06F 16/9024; G06F 11/0772
USPC ......................................................... 714/57
See application file for complete search history.

(56) References Cited

U.S. PATENT DOCUMENTS

| | | | |
|---|---|---|---|
| 7,017,080 B1 | 3/2006 | Liggesmeyer et al. | |
| 2007/0136326 A1* | 6/2007 | McClement | G06Q 10/10 |
| 2014/0101627 A1* | 4/2014 | Mochizuki | G06F 30/30 |
| | | | 716/106 |
| 2014/0180755 A1* | 6/2014 | Prieto | G06Q 10/0635 |
| | | | 705/7.28 |

OTHER PUBLICATIONS

Kuan-Min Lee, Ruey-Shi Chu, Sien-Chang Liu, A built-in performance-monitoring/fault isolation and correction (PM/FIC) system for active phased-array antennas, IEEE Transactions on Antennas and Propagation, Nov. 1993, vol. 41—Issue: 11.
I. James, D. Lumbard, I. Willis, J. Goble, Investigating No Fault Found in the Aerospace Industry, Reliability and Maintainability Symposium, 2003, Annual.

(Continued)

*Primary Examiner* — Yair Leibovich
(74) *Attorney, Agent, or Firm* — Bayramoglu Law Offices LLC

(57) ABSTRACT

A fault monitoring and management method that collects readings from hardware components and software functions to deduce the source of a system failure by utilizing a system representation method based on directed graphs. The presented method utilizes a system description that establishes absolute dependence, which means that the failure of a component leads to certain failure of the successor components that depend on the output of the failed component, between system or process elements. The change in the system behaviour upon the failure of each system element is automatically determined by algorithms that process the graph depiction of the system architecture.

2 Claims, 4 Drawing Sheets

(56) References Cited

OTHER PUBLICATIONS

C. S. Sung and S. H. Kim, Analysis of a Multi-Part Spares Inventory System Subject to Ambiguous Fault Isolation, The Journal of the Operational Research Society, Apr. 2001, pp. 418-432, vol. 52, No. 4.

P. Luthra, BIT analysis: how to approach it, Reliability and Maintainability Symposium, 1990. Proceedings., Annual, Jan. 23-25, 1990, 362-365, Los Angeles, CA, USA.

P. Luthra, FMECA: an integrated approach, Reliability and Maintainability Symposium, 1991. Proceedings., Annual, Jan. 29-31, 1991, 235-241, Orlando, FL, USA.

Samir Khan, Paul Phillips, Ian Jennions, Chris Hockley, No Fault Found events in maintenance engineering Part 1: Current trends, implications and organizational practices, Reliability Engineering and System Safety, Mar. 2014, pp. 183-195, vol. 123.

Samir Khan, Paul Phillips, Chris Hockley, Ian Jennions, No Fault Found events in maintenance engineering Part 2: Root causes, technical developments and future research, Mar. 2014, pp. 196-208, vol. 123.

J. Sztipanovits, G. Karsai, C. Biegl, T. Bapty, A. Ledeczi, A. Misra, MULTIGRAPH: an architecture for model-integrated computing, Engineering of Complex Computer Systems, 1995. Held jointly with 5th CSESAW, 3rd IEEE RTAW and 20th IFAC/IFIP WRTP, Proceedings , First IEEE International Conference on, Nov. 6-10, 1995, 361-368, Ft. Lauderdale, FL, USA.

Gabor Karsai, Janos Sztipanovits, Hubertus Franke, Samir Padalkar, Model-embedded On-line Problem Solving Environment for Chemical Engineering, Engineering of Complex Computer Systems, 1995. Held jointly with 5th CSESAW, 3rd IEEE RTAW and 20th IFAC/IFIP WRTP, Proceedings., First IEEE International Conference on, Nov. 6-10, 1995, 227-233, Ft. Lauderdale, FL, USA.

J.R. Carnes, A. Misra, J. Sziipanovits, Model-integrated toolset for fault detection, isolation and recovery (FDIR), Engineering of Computer-Based Systems, 1996. Proceedings., IEEE Symposium and Workshop on, Mar. 11-15, 1996, 356-363, Friedrichshafen, Germany.

M.S. Moore, J. Nichols, Model-based synthesis of a real-time image processing system, Engineering of Complex Computer Systems, 1995. Held jointly with 5th CSESAW, 3rd IEEE RTAW and 20th IFAC/IFIP WRTP, Proceedings., First IEEE International Conference on, Nov. 6-10, 1995, 262-265, Ft. Lauderdale, FL, USA.

Guidelines for Chemical Process Quantitative Risk Analysis, Center for Chemical Process Safety, American Institute of Chemical Engineers, pp. 661-670, 2nd ed.

C. Spreafico, D. Russo, C. Rizzi, A state-of-the-art review of FMEA/FMECA including patents, Computer Science Review, pp. 19-28, vol. 25, 2017.

S. Kabir, An overview of fault tree analysis and its application in model based dependability analysis, Expert Systems with Applications, 2017, pp. 114-135, vol. 77.

W. S. Lee, D. L. Grosh, F. A. Tillman, C. H. Lie, Fault Tree Analysis, Methods, and Applications—A Review, IEEE Transactions on Reliability, Aug. 1985, pp. 194-203, vol. R-34, No. 3.

S. A. Lapp, G. J. Powers, Computer-aided Synthesis of Fault-trees, IEEE Transactions on Reliability, Apr. 1977, pp. 2-13.

\* cited by examiner

AUTOMATED FAULT MONITORING AND MANAGEMENT METHOD

CROSS REFERENCE TO THE RELATED APPLICATIONS

This application is based upon and claims priority to Turkish patent application No. 2019/14300, filed on Sep. 20, 2019, the entire contents of which are incorporated herein by reference.

TECHNICAL FIELD

The present invention relates to a fault monitoring and management method that collects readings from hardware components and software functions to deduce the source of a system failure by utilizing a system representation method based on directed graphs.

BACKGROUND

The foremost methods used in fault management and system reliability analysis are FMEA (Failure Mode and Effects Analysis), fault tree analysis, event tree analysis, and reliability block diagrams. Among the methods for describing systems architecture, the functional flow block diagrams and design structure matrices can be considered as the leading examples.

The literature chosen as the illustration of the state-of-the-art for such methodologies stresses out the intense labour required for the FMEA and fault tree analysis methods. The patent numbered U.S. Pat. No. 7,017,080B1 offers a method and system for determining a fault tree of a technical system, computer program product and a computer readable storage medium. The faults are described using a fault description which comprises data which have been determined using failure modes and effects analysis. The fault description is extended by information regarding the dependency of possible faults and the frequency of occurrence of said faults. The extended fault description is used to ascertain, for a prescribed fault event, the fault tree and the frequency of occurrence of the fault event.

Improvements suggested for both methods hold on to the event-centric structure of these methods. While a logic-based set of rules is proposed for the analysis of the system architecture, the event-centric investigation of the system elements requires efforts of systems engineers and other experts to devise the events at the element level and establish the logic rules that connect those events to other system elements and events. Event tree analysis faces the same issues because of its relation to fault tree analysis and the same event-centric approach. Reliability block diagram, functional flow block diagram and design structure matrix methodologies can demonstrate the dependency between the system elements, however, for these methodologies there are no criteria to determine the required depth of the system analysis to establish a logic-based rule set that describes the dependencies between system elements. As there is no criteria to establish correspondence between system/process elements, the transition between system descriptions (such as reliability block diagram, functional flow block diagram, design structure matrix), and methods for reliability analysis (such as fault tree analysis, FMEA), require intensive manual labor and case specific analysis.

During the system design phase, built-in-test equipment (BITE) placement must be planned for fault detection and diagnosis. However, there is no analytical method for BITE placement that also takes into account the fault detection and diagnosis level, such as line replaceable unit level or shop replaceable unit level. Fault scenarios are examined through reliability analysis methods and BITE placement is decided according to the criticality level of the scenario. This practice is also labour intensive and case specific.

SUMMARY

The invention establishes a system description and analysis technique that is based on the graph theory, in order to automate the fault management and reliability analysis. While, in the other reliability analysis methods, the system behaviour is analysed based on the events conceived by system engineers and designers, the presented method describes the system behaviour based on the dependency relations between system elements. The change in the system behaviour upon the failure of each system element is automatically determined by algorithms that process the graph depiction of the system architecture.

The presented method establishes a three-tiered system description and analysis structure. The first tier translates the working parameters of system elements into binary fault indicators. This first tier incorporates the design parameters on the element level into the fault management and reliability analysis, which is a novelty of this invention.

The second tier establishes absolute dependency relationships between system elements. Deepening the system analysis until there are only absolute dependencies between system elements makes possible the fault management and reliability analysis automation, which is another novelty presented by the new method. From another point of view, establishing absolute dependency relationships between system elements presents an analytical criterion for determining the sufficiency of the analysis depth, which is another novelty of the proposed method.

The third tier provides the analysis outputs, such as the fault tree or the FMEA for reliability analyses or fault management outputs and maintenance requests when the system or process is running. Gradual degradation and sub-optimal performance assessment are also handled by the third tier. Different reliability analysis methods can be implemented on this third tier; as all analysis on the third tier is based on the common system description on the first and second tiers, the gap between different analysis methods in the state-of-the-art is closed with this new method.

DETAILED DESCRIPTION OF THE INVENTION

Figure 1:
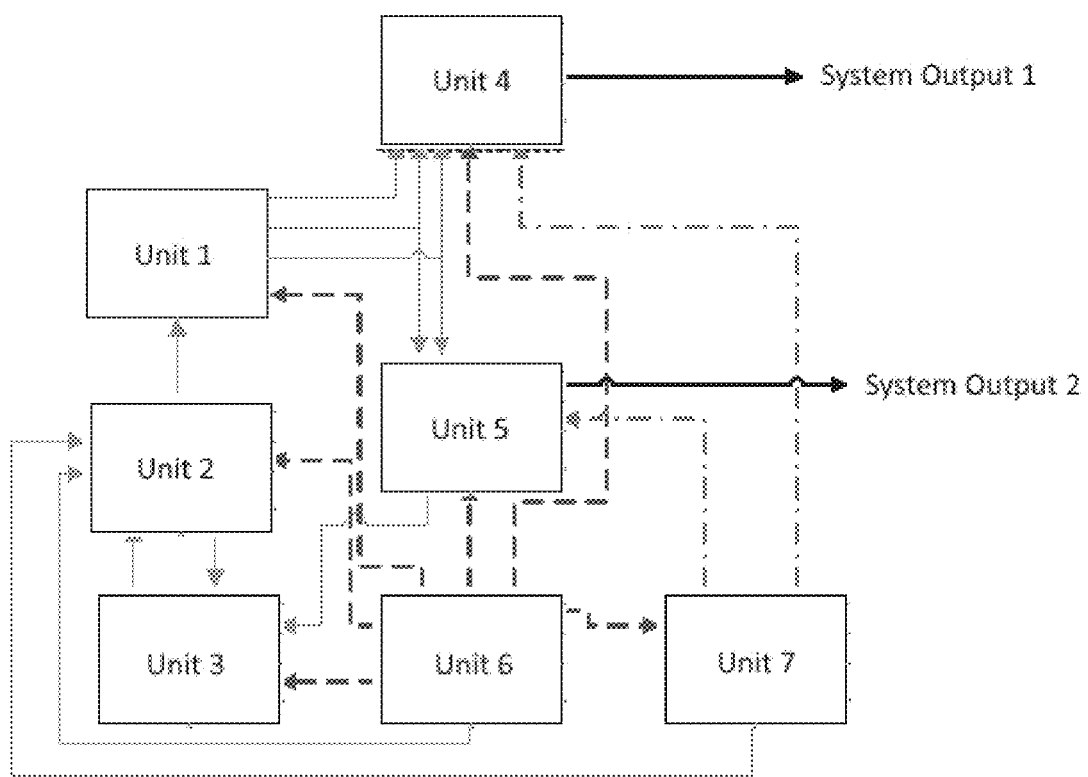
FIG. 1 shows exemplar generic system block scheme.

The invention is a fully automated fault monitoring and management method that utilizes a system description that establishes absolute dependence relations between system or process elements, which are described as a directed graph. The invention can be used for the fault management of all processes and systems, such as those processes in chemical processing plants, power stations, aerospace systems and defense systems. The invention is applicable to all levels of detail, for example component level in electronic systems and algorithm units and message interfaces between software modules, where the principle of absolute dependency is applicable. The nomenclature used in this invention disclosure is given below:

Directed Graph: The directed graph representation depicts a system or a process in terms of vertices and directed edges that connect these vertices.

Vertex: A vertex is a point which is connected to other such points, namely vertices, by strings that are called edges.

Directed Edge: A directed edge establishes the connection in one direction only. For example, if two vertices designated by the letters A and B are connected with a directed edge pointing from A to B, the vertex A is the predecessor of B and the vertex B is the successor of A.

System Component: A system component is a hardware or software component with well-defined input and output relationships with other system components. Each individual function of a software module can be considered as a system component. Similarly, an assembly of electronic parts, such as a hardware module or a PCB card, or even a single integrated circuit can be considered as a system component.

Dependence: When a system component requires at its input the output from another component, the first component is said to be dependent on the other component.

Component Failure: A component is declared as faulty when it cannot fulfil its intended function. The failure status is totally behavioural in this context: If the output of a component does not adhere with the designed parameter ranges and tolerances, the component is declared faulty. The reason for the failure might be due to a malfunction of the component itself or because of an inadequate input provided by another component along the chain.

Absolute Dependence: When the dependence relation between the system components is such that the failure of a component leads to certain failure of the successor components that depend on the output of the failed component, the dependence relation between these components is said to be absolute.

Observable Vertex: If fault state of a vertex is reported to an interface observable by an end user or by the fault manager, the vertex is designated as observable. Observable vertices may correspond to BITE or controllers that send back messages regarding their status. All observable system outputs are assigned an observable vertex. The invention deduces the fault states of the non-observable vertices and the corresponding components by the fault deduction algorithm presented below.

A generic system block scheme is presented as an example in FIG. 1. Utilizing the analysis method that is part of this invention, each system block is analysed considering dependence relations within each block and dependences arising from the interfaces with the other blocks. The vertex points and directed edges obtained through the analysis for the generic system is presented as an example in FIG. 2. Internal vertices are defined for the blocks of this exemplar system to demonstrate various cases that may arise during the analysis of different processes and systems.

Principles forming the basis of the invention and structures utilized in the analyses are described below. For brevity, the term system will be used as the focus of the presented method, whereas any claims pertaining to systems management are also valid for managing processes. The application of the invention consists of two stages. The first stage concerns the construction of the system representation as a directed graph. The second stage is the operation of the fault management module, which can be implemented as a separate processor or embedded in the existing processors of a system and which utilizes the system representation to deduce and isolate faults occurring during the system operation.

Stage 1: Construction of the System Representation

Components of the system, which has well-defined inputs and outputs, are determined and a vertex point is assigned to each such system component. Parameter ranges are defined for each output, according to which the failure status of the component is determined. As long as each component operates within the defined parameters, the state of the vertex that is assigned to that component is non-faulty. When the component operates such that the outputs are outside the determined parameters or failed completely, the corresponding vertex is assigned a faulty state.

All the system components must have an absolute dependence relationship between each other, which means that the failure of a component leads to certain failure of the successor components that depend on the output of the failed component. For the directed graph representation, the presence of an edge directed from one vertex to another denotes that when a vertex is faulty, the successor vertices to that faulty vertex must also be faulty. A possible implementation method for determining the system components and the input and output relationships is to focus on the interfaces between system blocks depicted in the system block scheme. Another possible implementation method is to consider each system module and start the analysis from the interfaces between modules. Each interface must be replaced by at least one edge that describes the dependence between the two blocks, and vertices must be defined that provide the output to the interface and utilize the input from the interface to fulfil a function.

Stage 2: Operation of the Fault Manager

Figure 3:
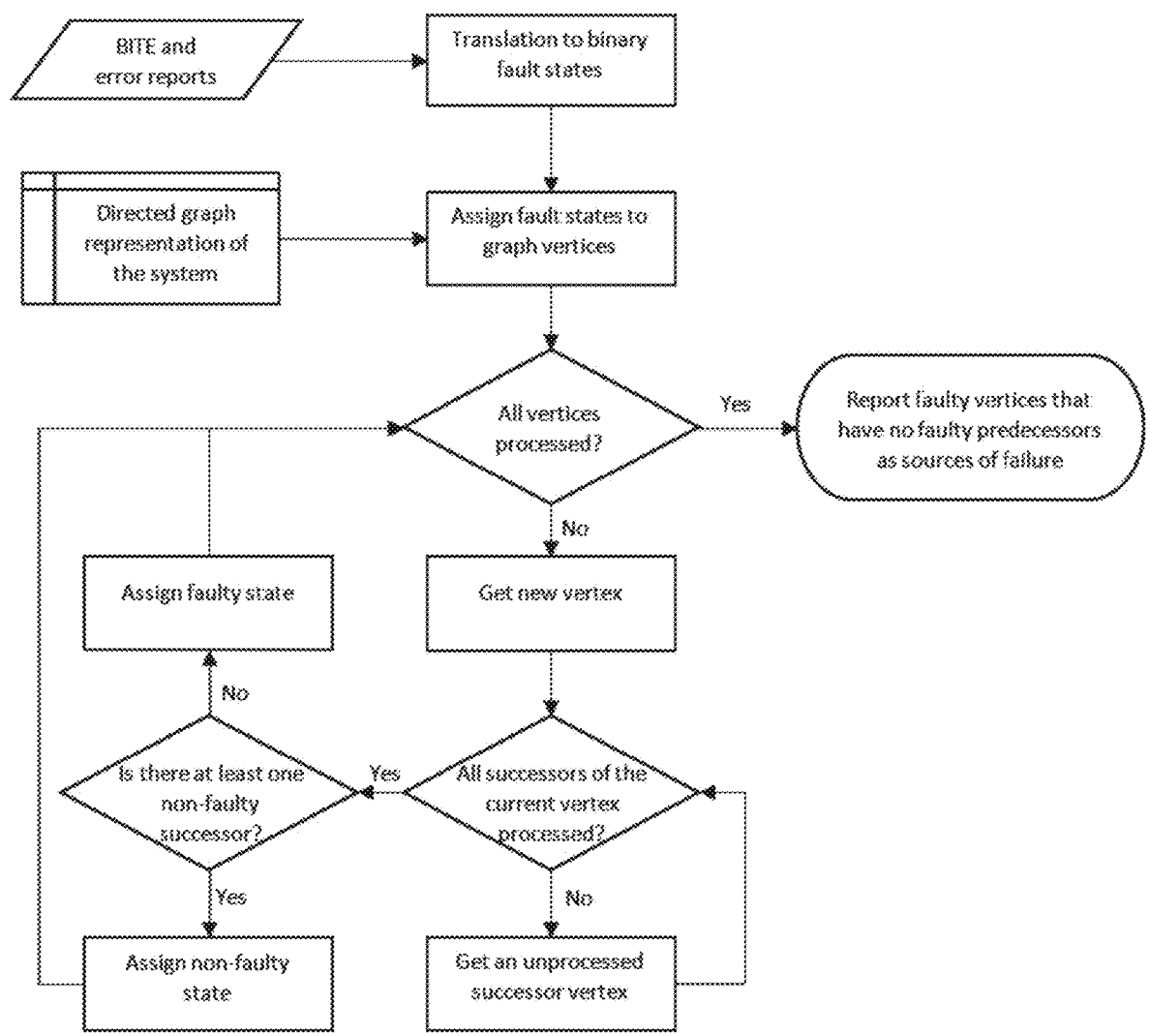
FIG. 3 shows flow chart of the fault management module operation.

The automated fault management module operates by collecting the BITE readings of hardware components and error reports of the software functions, which are translated to binary fault states and assigned to the corresponding observable vertices. The directed graph representation of the system with absolute dependence relation between vertices forms the basis of the fault propagation and diagnosis algorithms running in the fault management module. A fault propagation analysis emerges as a result of the absolute dependence principle. According to fault propagation principle, if a vertex falls into the faulty state, all the successor vertices (vertices at the end of edges going out from the faulty vertex) should fail to fulfil their functions and fall into the faulty state. Based on this principle, the fault states of the observable vertices are used to deduce the underlying cause of the fault among the non-observable vertices. For a vertex under investigation, if any successor vertex is functional, then the vertex under investigation cannot have a faulty state. However, if all the observable vertices succeeding a non-observable vertex are faulty, that non-observable vertex is deduced to be the source of the failure. The operation of the fault management module is presented as flow chart in FIG. 3.

Figure 4:
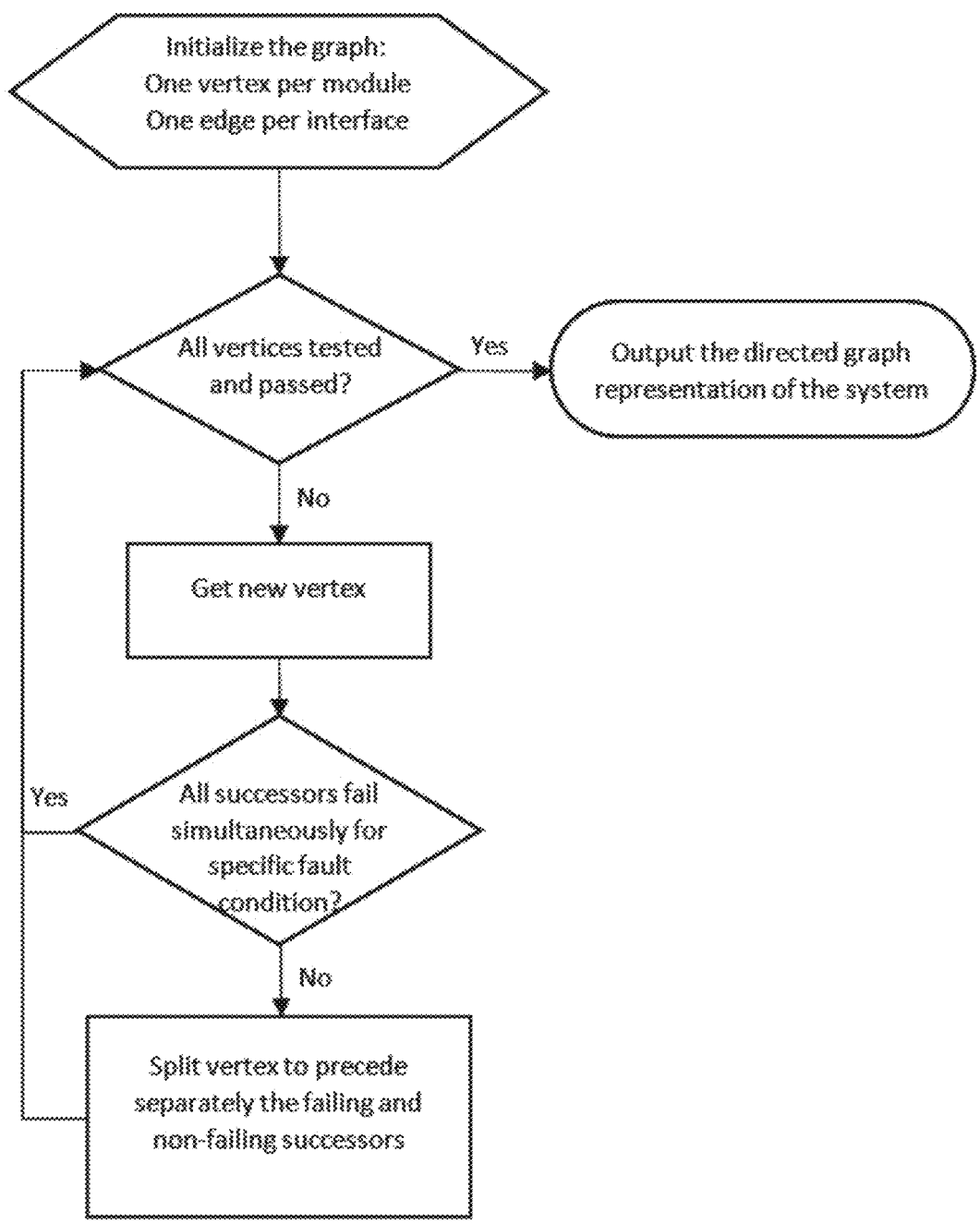
FIG. 4 shows flow chart describing the analysis methodology for constructing the directed graph representation of a system or process.

It is noted that component designations based on the block scheme representations of the system or existing system modules will often prove to be too low resolution to allow fault isolation. The matching between the actual operation of a system and the fault propagation principle on its directed graph representation is a proof of the completeness of the analysis and adherence to absolute dependence principle. In other words, the system representation method that is part of this invention, namely the automated fault manager module, and the fault management algorithm running in this fault management module constitute a cross-checking mechanism for the completeness of the system representation. The flow chart describing the analysis methodology for constructing the directed graph representation of a system or process is given in FIG. 4.

An Implementation Example

Figure 2:
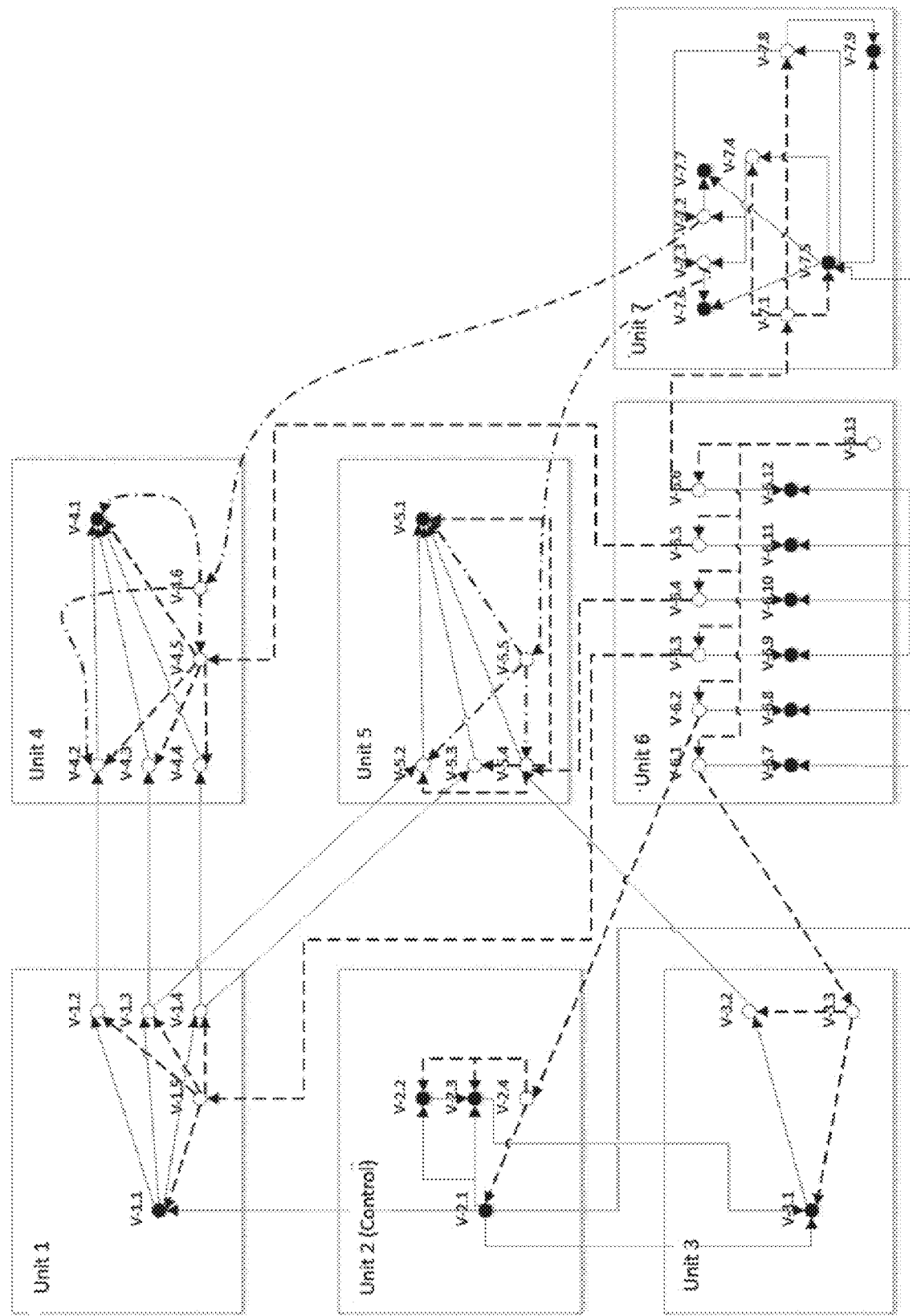
FIG. 2 shows directed graph representation of the exemplar generic system wherein v-1.1, v-1.2, ..., v-7.9 indicates different absolute dependent vertices in Units 1-7.

A fault identification algorithm is considered as an example of the utilization of the fault management module. The exemplar generic system in FIG. 2 is considered for this example. The vertices depicted as filled circles are observable vertices. Observable vertices in Unit 1, Unit 2 and Unit 3 can be considered as controllers and data processors, status of which can be observed by exchanging messages. The fault management module can be embedded in the existing controller in Unit 2. It can also be a stand-alone module that collects the BITE readings from the hardware components and error reports from software modules and other controllers. In this example, the observable vertices in Unit 6 are BITE that measures the outputs of the hidden vertices within the same unit for detecting faults. In Unit 7, the vertex V-7.5 is a controller while the other observable vertices are BITE. Considering an example where a fault is detected at the system output depicted as vertex V-5.1 while the system output at vertex V-4.1 is functional:

1—Each observable vertex is assigned a fault state. In this example, only V-5.1 is observed as faulty, thus, all other observable vertices are assigned the functional state. Unobservable vertices are assigned faulty states, which will be cleared as the fault isolation progresses.

2—Starting from the system outputs, for each vertex the following procedure is run:
  a. To start investigating a vertex, all successor vertices must be investigated already. If there is a successor vertex that is not yet investigated, the investigation is run for that vertex first. Thus, first a vertex is checked for successor's completeness.
  b. If the successor's completeness is checked twice for any vertex without being able to make any fault assessment in between the two checks, a circular dependence is detected among a group of vertices. There should be at least one observable vertex within any such circular dependent group, otherwise, fault identification is impossible.
  c. If all edges coming out of a vertex end up in faulty vertices, in other words, if all successor vertices are faulty, then the vertex under investigation is deemed faulty.
  d. If at least one successor vertex is functional, the vertex under investigation is deemed functional.

3—Any vertex that is assigned a faulty state but has functional predecessors is reported to fault management.

When this algorithm runs, predecessors of the faulty vertex V-5.1, which are V-5.2, V-5.3, V-5.4 and V-5.5, are marked as faulty. However, predecessors of these vertices in Unit 1, which are V-1.3 and V-1.4, are marked as functional, because their other successor vertices in Unit 4 are functional themselves. However, the faulty vertex V-5.4 is the sole successor of the vertex V-3.2 in Unit 3, which compels marking V-3.2 as faulty. While there are vertices in Unit 6 and Unit 7 for which faulty vertices in Unit 5 are successors, having another successor vertex for BITE clears these vertices in each unit. As a result of this analysis, a requirement for BITE monitoring V-3.2 in Unit 3 is revealed. Otherwise, a fault observed in Unit 5 cannot be isolated to Unit 5. If the same analysis is run for a fault in V-4.1, a similar requirement for BITE monitoring V-1.2 in Unit 1 is revealed. The same analysis can be repeated for all vertices, fault isolation ratio can be analysed and suggestions for BITE placement can be generated completely automatically.

REFERENCES

Kuan-Min Lee, Ruey-Shi Chu, Sien-Chang Liu, "A built-in performance-monitoring/fault isolation and correction (PM/FIC) system for active phased-array antennas," IEEE Transactions on Antennas and Propagation (Volume: 41, Issue: 11, November 1993).

I. James, D. Lumbard, I. Willis, J. Goble, "Investigating No Fault Found in the Aerospace Industry," Reliability and Maintainability Symposium, 2003. Annual, 27-30 Jan. 2003.

C. S. Sung and S. H. Kim Analysis of a Multi-Part Spares Inventory System Subject to Ambiguous Fault Isolation, The Journal of the Operational Research Society, Vol. 52, No. 4 (April, 2001), pp. 418-432.

P. Luthra, "BIT analysis: how to approach it," Reliability and Maintainability Symposium, 1990. Proceedings, Annual, Los Angeles, Calif., USA, 23-25 Jan. 1990.

P. Luthra, "FMECA: an integrated approach," Reliability and Maintainability Symposium, 1991. Proceedings, Annual, Orlando, Fla., USA, 29-31 Jan. 1991.

Samir Khan, Paul Phillips, Ian Jennions, Chris Hockley, "No Fault Found events in maintenance engineering Part 1: Current trends, implications and organizational practices," Reliability Engineering and System Safety, Volume 123, March 2014, Pages 183-195.

Samir Khan, Paul Phillips, Chris Hockley, Ian Jennions, "No Fault Found events in maintenance engineering Part 2: Root causes, technical developments and future research," Volume 123, March 2014, Pages 196-208.

J. Sztipanovits, G. Karsai, C. Biegl, T. Bapty, A. Ledeczi, A. Misra, "MULTIGRAPH: an architecture for model-integrated computing," Engineering of Complex Computer Systems, 1995. Held jointly with 5th CSESAW, 3rd IEEE RTAW and 20th IFAC/IFIP WRTP, Proceedings, First IEEE International Conference on, 6-10 Nov. 1995, Ft. Lauderdale, Fla., USA Gabor Karsai, Janos Sztipanovits, Hubertus Franke, Samir Padalkar, "Model-embedded On-line Problem Solving Environment for Chemical Engineering," Engineering of Complex Computer Systems, 1995. Held jointly with 5th CSESAW, 3rd IEEE RTAW and 20th IFAC/IFIP WRTP, Proceedings, First IEEE International Conference on, 6-10 Nov. 1995, Ft. Lauderdale, Fla., USA J. R. Carnes, A. Misra, J. Sztipanovits, "Model-integrated toolset for fault detection, isolation and recovery (FDIR)," Engineering of Computer-Based Systems, 1996. Proceedings, IEEE Symposium and Workshop on, 11-15 Mar. 1996, Friedrichshafen, Germany M. S. Moore, J. Nichols, "Model-based synthesis of a real-time image processing system," Engineering of Complex Computer Systems, 1995. Held jointly with 5th CSESAW, 3rd IEEE RTAW and 20th IFAC/IFIP WRTP, Proceedings, First IEEE International Conference on, 6-10 Nov. 1995, Ft. Lauderdale, Fla., USA

*Guidelines for Chemical Process Quantitative Risk Analysis*, $2^{nd}$ ed. pp. 661-670, Center for Chemical Process Safety, American Institute of Chemical Engineers.

C. Spreafico, D. Russo, C. Rizzi, "A state-of-the-art review of FMEA/FMECA including patents," Computer Science Review, Vol. 25, 2017, pp. 19-28.

S. Kabir, "An overview of fault tree analysis and its application in model based dependability analysis," Expert Systems with Applications, Vol. 77, 2017, pp. 114-135.

W. S. Lee, D. L. Grosh, F. A. Tillman, C. H. Lie, "Fault Tree Analysis, Methods, and Applications—A Review," IEEE Transactions on Reliability, Vol. R-34, No: 3, August 1985, pp. 194-203.

S. A. Lapp, G. J. Powers, "Computer-aided Synthesis of Fault-trees," IEEE Transactions on Reliability, April 1977, pp. 2-13.

What is claimed is:

1. A computer implemented method for fault monitoring and management,
   wherein the fault monitoring and management method utilizes a system description and the system description establishes absolute dependence,
   wherein absolute dependence defines that a failure of any component leads to a next failure of successor components,
   wherein the successor components depend on an output of a failed component between system and process elements,
   wherein the method deduces a source of a system failure by utilizing a system representation based on directed graphs when the system is running,
   the method comprising the steps of:
      constructing a directed graph representation of a system architecture by initializing the directed graph with one vertex per module and one edge per interface;
      collecting Built-in-Test Equipment (BITE) readings of system components and at least one of software function and error reports;
      translating the error reports to binary fault states;
      assigning binary fault states to corresponding observable vertices of the directed graphs;
      analyzing system blocks considering dependence relations within each system block and dependencies arising from interfaces with different blocks to obtain vertex points and directional edges;
      running fault propagation analysis in a fault management module wherein the fault management module is a separate processor or an embedded processor in an existing processor of a system;
         wherein when a vertex falls into a faulty state, all successor vertices fail to fulfil functions and fall into the faulty state,
         wherein when a successor vertex is functional, a predecessor vertex under investigation does not have the faulty state,
         wherein when all observable vertices succeeding a non-observable vertex are faulty, the non-observable vertex is deduced to be a source of a failure;
      reporting faulty vertices wherein the faulty vertices have no faulty predecessors as the source of the failure; and
      calculating a fault isolation ratio and sending suggestions for a placement of a built-in-test equipment (BITE) automatically.

2. The method according to claim 1, further comprising splitting the vertex to precede separately failing and non-failing successors when all successors fail simultaneously for a specific fault condition.

* * * * *